(12) United States Patent
Chen et al.

(10) Patent No.: US 12,417,135 B2
(45) Date of Patent: Sep. 16, 2025

(54) METHOD AND SYSTEM FOR CONSISTENT API APPLICATION TO HETEROGENEOUS BARE METAL SERVERS

(71) Applicant: QUANTA CLOUD TECHNOLOGY INC., Taipei (TW)

(72) Inventors: Yen-Hsun Chen, Taipei (TW); Chiun-Yu Kuo, Taipei (TW); Tong-Pai Huang, Taipei (TW); Chia-Jui Lee, Taipei (TW)

(73) Assignee: QUANTA CLOUD TECHNOLOGY INC., Taipei (TW)

( * ) Notice: Subject to any disclaimer, the term of this patent is extended or adjusted under 35 U.S.C. 154(b) by 678 days.

(21) Appl. No.: 17/814,638

(22) Filed: Jul. 25, 2022

(65) Prior Publication Data

US 2023/0064313 A1    Mar. 2, 2023

Related U.S. Application Data

(60) Provisional application No. 63/238,536, filed on Aug. 30, 2021.

(51) Int. Cl.
  *G06F 9/4401*  (2018.01)
  *G06F 9/455*   (2018.01)
  *G06F 9/54*    (2006.01)

(52) U.S. Cl.
  CPC .......... *G06F 9/547* (2013.01); *G06F 9/45541* (2013.01)

(58) Field of Classification Search
  CPC .... G06F 9/547; G06F 9/45541; G06F 9/4411; G06F 13/102
  See application file for complete search history.

(56) References Cited

U.S. PATENT DOCUMENTS

| | | | |
|---|---|---|---|
| 10,761,838 B2 | 9/2020 | Roy et al. | |
| 11,281,476 B2 | 3/2022 | Thulasi et al. | |
| 2007/0169116 A1* | 7/2007 | Gujarathi | G06F 9/4411 717/174 |
| 2011/0320799 A1* | 12/2011 | Lam | H04L 67/34 713/2 |
| 2019/0294448 A1* | 9/2019 | Cerri | H04L 41/0803 |
| 2021/0240491 A1* | 8/2021 | Downum | G06F 9/4406 |
| 2022/0066787 A1* | 3/2022 | Warkentin | G06F 8/63 |

FOREIGN PATENT DOCUMENTS

AU    2018379088 B2    6/2019

* cited by examiner

*Primary Examiner* — Brian W Wathen
(74) *Attorney, Agent, or Firm* — NIXON PEABODY LLP

(57) ABSTRACT

A system and method for management of heterogeneous bare metal servers is disclosed. The system includes target bare metal servers coupled to a network and an administrative server. The administrative server executes a framework for managing the bare metal servers. The framework includes unified APIs for performance of management functions. A recognition engine receives identification information from the server and selects a driver from a driver library based on the identification information. Each of the drivers in the driver library is associated with a different type of bare metal server. A driver loader loads the selected driver to translate the unified APIs to native APIs on the bare metal server to perform the management function on the server.

20 Claims, 11 Drawing Sheets

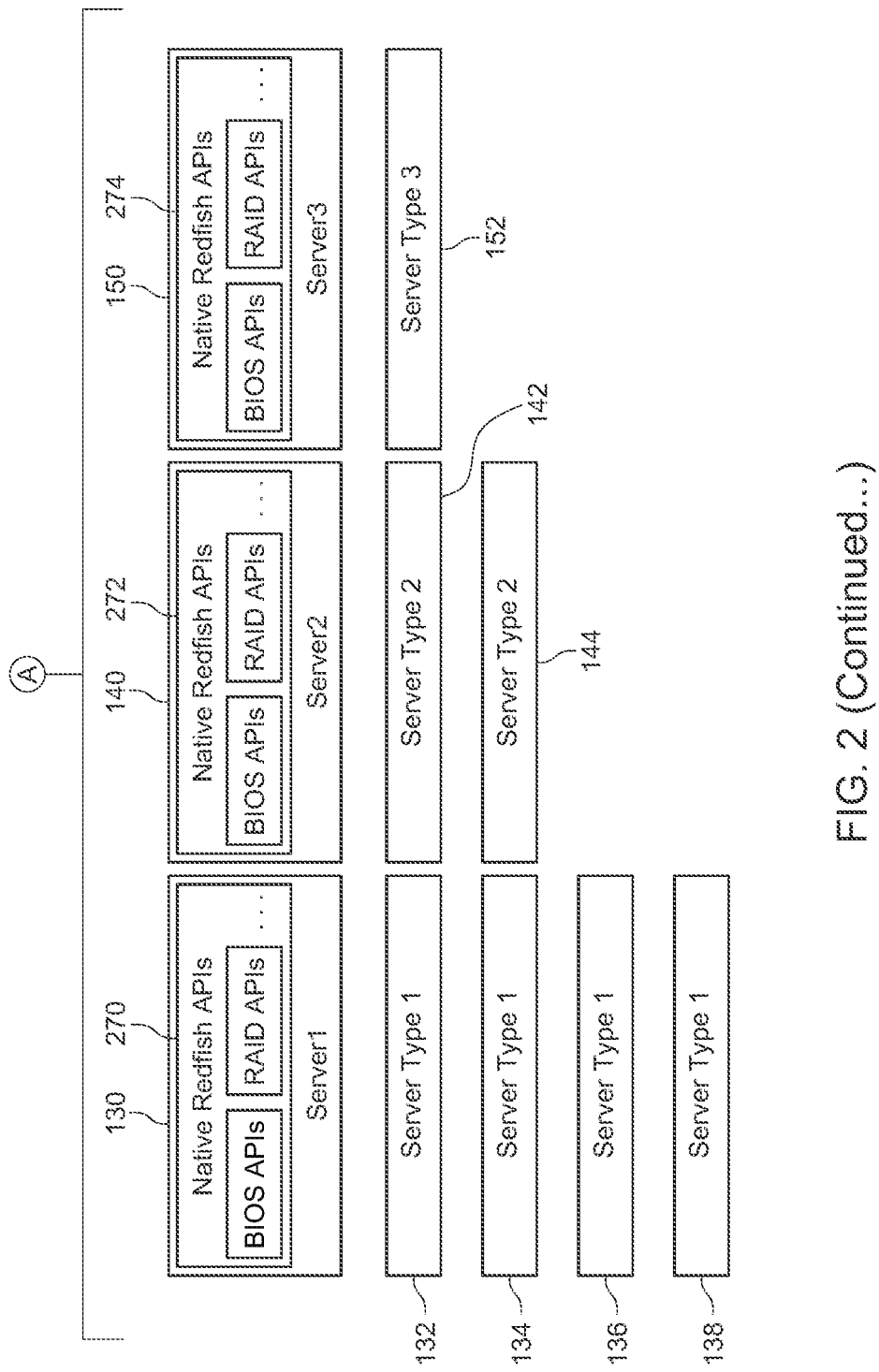
FIG. 2 (Continued...)

METHOD AND SYSTEM FOR CONSISTENT API APPLICATION TO HETEROGENEOUS BARE METAL SERVERS

PRIORITY CLAIM

The present disclosure claims the benefit of and priority to U.S. Provisional Ser. No. 63/238,536 filed on Aug. 30, 2021. The contents of that application are hereby incorporated by reference in their entirety.

TECHNICAL FIELD

The present disclosure relates generally to management of computing devices. More particularly, aspects of this disclosure relate to a system that recognizes and provides a generic API for provisioning bare metal servers regardless of the type of API employed by the bare metal servers.

BACKGROUND

Servers are employed in large numbers for high demand applications, such as network based systems or data centers. The emergence of the cloud for computing applications has increased the demand for data centers. Data centers have numerous servers that store data and run applications accessed by remotely connected, computer device users. A typical data center has physical chassis rack structures with attendant power and communication connections. Each rack may hold multiple computing servers and storage servers that are networked together.

The servers in a data center facilitate many services for businesses, including executing applications, providing virtualization services, and facilitating Internet commerce. Servers typically have a baseboard management controller (BMC) that manages internal operations and handles network communications with a central management station in a data center. Different networks may be used for exchanging data between servers and exchanging operational data on the operational status of the server through a management network.

As companies place more dependence on services from data center servers, uptime becomes more critical and valuable. When a server or servers are not available, productivity slows down or stops entirely, costing businesses profitability. Although a data center manager may take every precaution to prevent service from being interrupted from faults in the servers, the problem of server downtime is difficult to fully eliminate. For example, server firmware may be updated to improve the operation of such hardware components without having to replace them, but this requires some down time to update the firmware. In addition, bringing bare metal servers into operation involves configuration and installing software and firmware. Server downtime thus often results from either setting up new servers or making upgrades to existing software and firmware.

For data center administrators, one challenge is preparing multiple different types of servers as this process consumes time and resources. To streamline the management of bare-metal servers, administrators generally adopt scripts that are composed of native Redfish Application Programming Interfaces (APIs) provided by the BMC to remotely perform management functions such as checking the firmware version and the number of commodities, and configuring the BIOS and storage devices such as a redundant array of independent drives (RAID). However, the native Redfish APIs vary in accordance with Redfish API versions that bare-metal server vendors comply with. As a result, the existing scripts for server management may fail when applied to a new bare metal server model with an unknown Redfish API version. Traditionally, the scripts in an automation process are generally written to call Redfish APIs for controlling a server; however, the scripts fail to control a new model server since the native Redfish APIs may vary by different server models. Data center administrators thus need to invest time into modifying scripts or even developing a whole new script, resulting in ineffective management process for bare metal servers particularly as the number of server models available increases.

Thus, there is a need for a system for allowing a single set of scripts to manage heterogeneous bare-metal servers. There is a need for a pluggable driver framework between universal scripts for server management and the native Redfish APIs on different model bare-metal servers. There is another need for a framework can translate native Redfish APIs of bare-metal servers from a unified RESTful API interface for server management and control.

SUMMARY

One disclosed example is a server management system including a target bare metal server and a network coupled to the target bare metal server. An administrative server is coupled to the network. The administrative server executes a framework for managing the target bare metal server. The framework includes a unified API for performance of the management function. A recognition engine extracts identification information from the server and selects a driver from a set of drivers based on the identification information. Each of the drivers is associated with a different type of bare metal server. A driver loader loads the selected driver to translate the unified API to a native API on the target bare metal server to perform the management function on the target bare metal server.

A further implementation of the example system is an embodiment where the administrative server executes a user script for initiating the management functions of the target bare metal server. Another implementation is where the management function is one of registering the target bare metal server; configuring a basic input/output system (BIOS); configuring a storage device; introspection of hardware; upgrading firmware; checking commodities; or provisioning an operating system. Another implementation is where the system includes a driver library storing the plurality of drivers. Another implementation is where the driver library includes a common library including groups of translation functions that translate the unified API into standard Redfish APIs. Another implementation is where the target bare metal server includes a baseboard management controller (BMC). The BMC communicates with the administrative server via the network. Another implementation is where the native API is a Redfish API. Another implementation is where the unified API is one of a plurality of unified APIs each associated with a server management function. Another implementation is where the unified API is a server registration API that obtains the server information from the target bare metal server when the target bare metal server is initially connected to network.

Another disclosed example is a method of managing a plurality of heterogeneous servers through a framework having a recognition engine and a driver library. Performance of a management function is initiated for one of the servers. A unified API corresponding to the management function is accessed. Identification information of the server is extracted from one of the servers. A driver from the driver library corresponding to the identification information of the server is loaded. The driver is executed to translate the unified API to a native API on the server to perform the management function.

Another implementation of the example method is where the performance of the management function is initiated by a script executed by the administrative server. Another implementation is where the management function is one of registering the server; configuring a basic input/output system (BIOS); configuring a storage device; introspection of hardware; upgrading firmware; checking commodities; or provisioning an operating system. Another implementation is where the method includes storing the plurality of drivers in a driver library. Another implementation is where the driver library includes a common library including groups of translation functions that translate the unified API into standard Redfish APIs. Another implementation is where the server includes a baseboard management controller (BMC). Another implementation is where the native API is a Redfish API. Another implementation is where the unified API is one of a plurality of unified APIs each associated with a server management function. Another implementation is where the unified API is a server registration API that obtains the server information from the server when the server is initially connected to network.

Another disclosed example is an administrative server allowing management of networked computer devices. The server includes a set of unified APIs each corresponding to a management function. A recognition engine obtains identification information of a selected networked computer device. The server includes a driver library having a set of drivers, each of the drivers translating one of the unified APIs into native APIs of one type of networked computer device. The recognition engine selects a driver from the driver library based on the type of selected networked computer device. A driver loader is coupled to the recognition engine. The driver loader loads the selected driver to perform a management function on the selected computer device.

Another implementation of the example administrative server is where the networked computer devices are each a server having a baseboard management controller (BMC) communicating with the administrative server.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
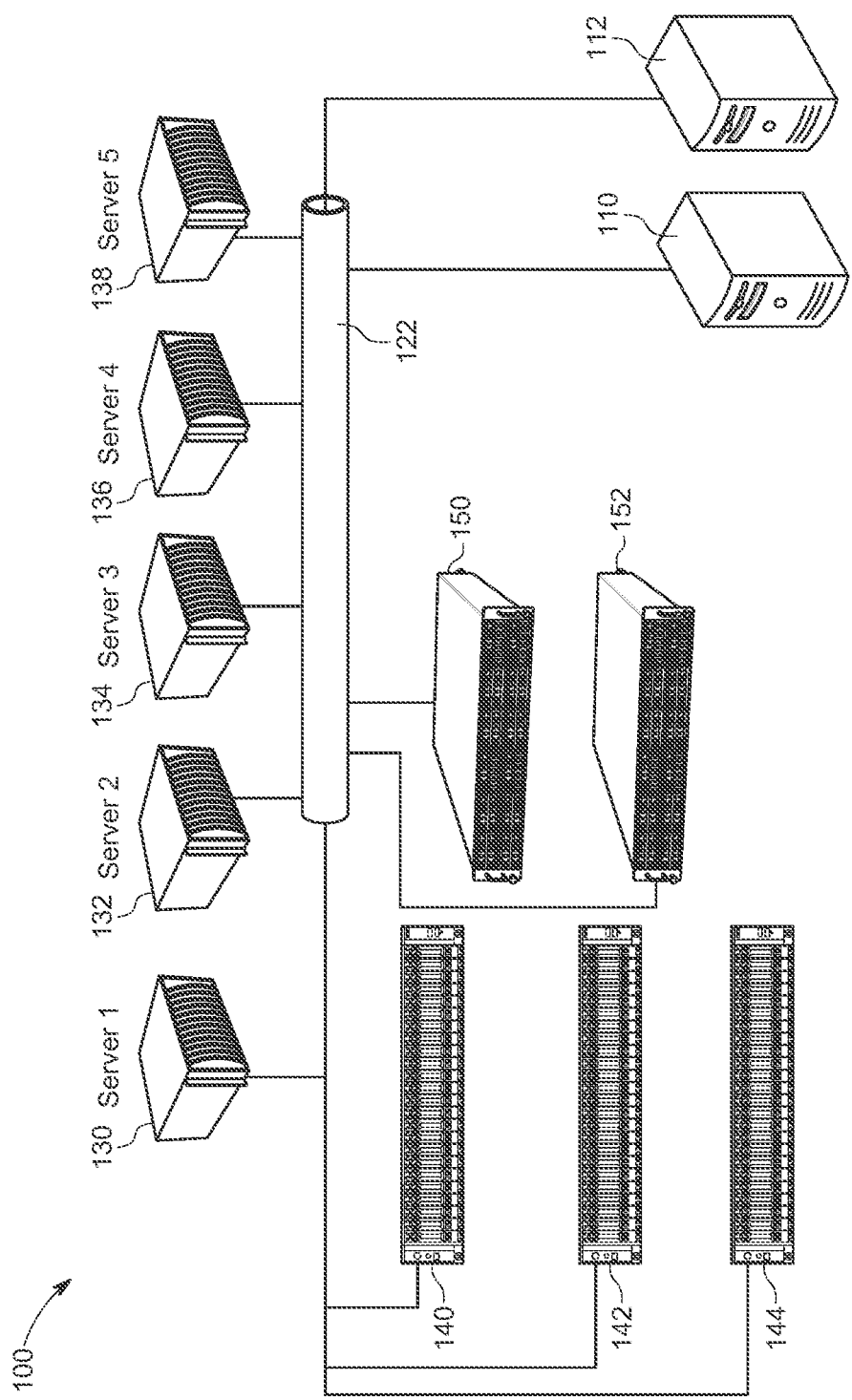
FIG. 1 is a block diagram of a system of different model bare metal servers in a data center.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward a framework with unified application programming interfaces (APIs) using pluggable drivers (called the framework hereinafter) to address API inconsistency resulting from having multiple different models of bare metal servers. Administrators can utilize a defined single interface, and with the unified APIs, manage a batch of different bare metal servers. In this framework, a translator (termed a driver) can be used to convert the unified APIs format to native Redfish APIs format for communicating with a target server. The example framework is composed of three layers, including a unified APIs layer, a driver selector layer, and a driver library layer. The Unified APIs layer provides representational state transfer (REST)ful Redfish APIs. The Driver Selector layer comprises a recognition engine and a driver loader. The recognition engine can recognize a server model, analyze server information, and select suitable drivers for the driver loader to dynamically load drivers. In the Driver Library layer, the drivers are developed based on Redfish standard to translate unified APIs into native Redfish APIs executing on diverse bare-metal servers.

By adopting the example framework, administrators can utilize unified APIs to operate bare metal servers of different models. Since the driver selector can automatically recognize server models, the driver-selection process is enhanced to provide a robust and streamlined framework. Administrators can dynamically install new drivers to support different new server models without interrupting existing tasks.

FIG. 1 shows a server system 100 that includes multiple networked servers. The server system 100 includes a management or administration server 110 (or management station) that accesses a file server 112 that may store files for different operating system configurations, system environments and applications. The management or administration server 110 and file server 112 are coupled to a network 122. The administration server 110 may execute the API framework for management of heterogeneous bare metal servers. In this example, such servers are example target servers 130, 132, 134, 136, and 138 that are coupled to the network 122. Although there are five servers in this example, the principles apply to much larger numbers of servers or other computing devices. As will be explained, the target servers 130, 132, 134, 136, and 138 are a first type or model of bare-metal servers in the system 100 that are initialized and provisioned by the administration server 110. Another group of servers 140, 142, and 144 are a second type or model of bare-metal servers in the system 100 that differ from the type of bare metal servers 130, 132, 134, 136, and 138. A final group of servers 150 and 152 are a third type of bare-metal servers in the system 100.

In this example, the servers 130, 132, 134, 136, 138, 140, 142, 144, 150, and 152 each have a baseboard management controller (BMC). In this example, the BMC manages identification data relating to the particular server such as the server model number, server vendor, BMC vendor, Redfish version, or BMC firmware version. The BMC in each of the servers may access a network interface card or a network interface controller that is coupled to the network 122 to the external administrative station, such as the administration server 110. In this example, the network 122 is based either a LAN or a network across multiple LANs (i.e. a Layer-2 LAN or a Layer-3 Network). The BMC may perform hardware diagnostics of hardware components of the server. The BMC also monitors the health of hardware components of the server. The servers 130, 132, 134, 136, 138, 140, 142, 144, 150, and 152 all include hardware components that may perform functions, such as storage, computing and switching. For example, the hardware components may be processors, memory devices, network interface cards, storage controllers, PCIe devices/cards, and the like. Such hardware components must be supported by different software/firmware components for proper server operation.

The administration server 110 in this example executes a pluggable driver framework that allows an administrator to use generic scripts for server management to execute native Redfish APIs on bare metal servers to perform such management functions. In this example, each of three different types of servers (e.g., servers 130, 140, and 150) have different native Redfish APIs. The example framework can translate the native Redfish APIs of each of the different types of servers into a unified RESTful API interface. With the help of the translation from unified APIs to the native Redfish APIs via drivers specific to a model of servers stored in a library, administrators can adopt existing scripts to control heterogeneous types of bare metal servers.

Figure 2:
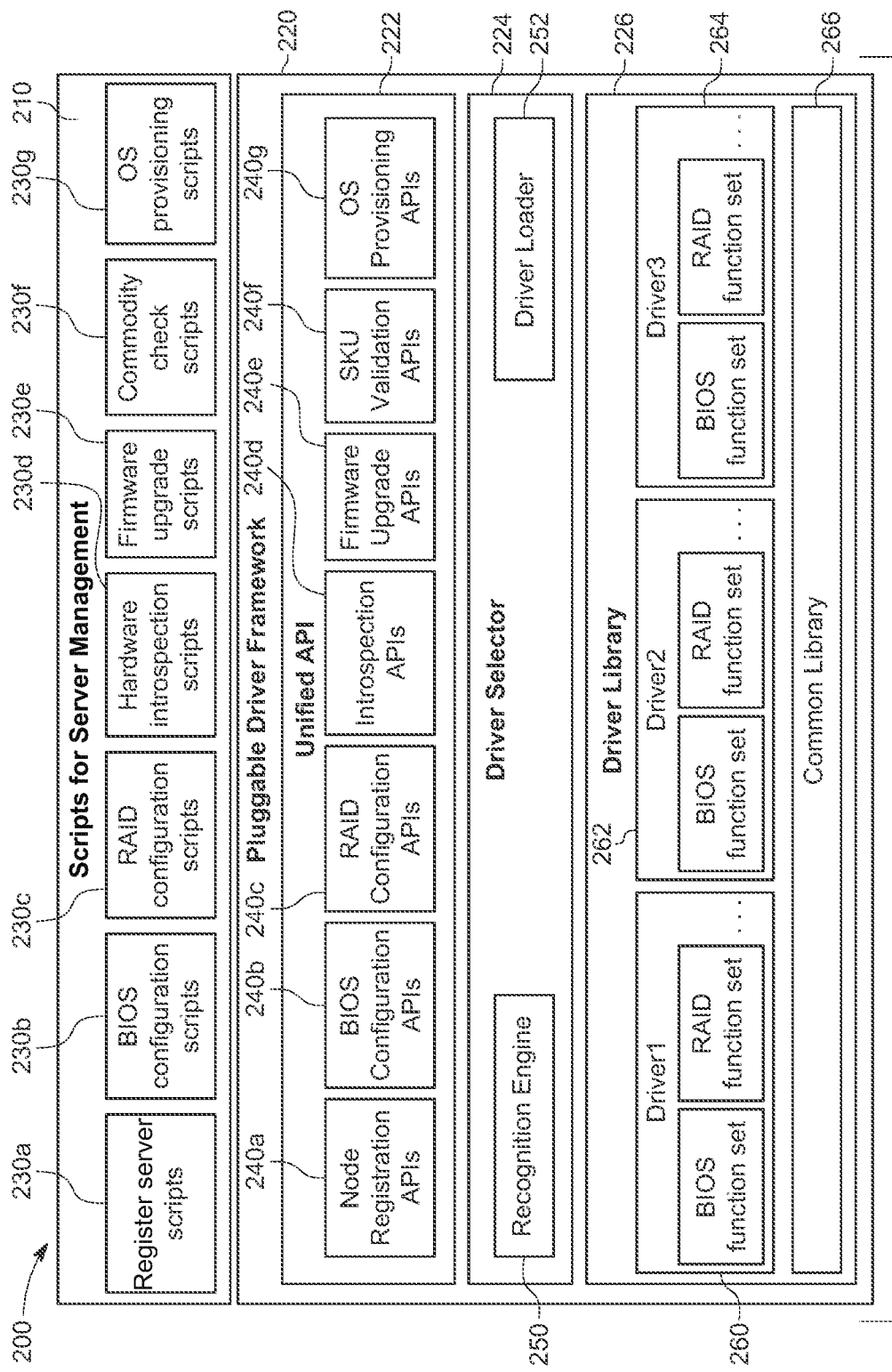
FIG. 2 is a block diagram of an example framework for allowing generic scripts to be used with heterogeneous bare metal servers such as those in FIG. 1.

FIG. 2 shows a block diagram of the system 100 in FIG. 1 with an example driver framework system 200. The driver framework system 200 includes a set of scripts 210 that may be accessed for different server management and control functions by an administrator. The framework system 200 interfaces with bare metal servers such as the servers 130, 132, 134, 136, 138, 140, 142, 144, 150, and 152 in FIG. 1. In this example, a driver framework 220 has three layers: 1) a unified API layer 222; 2) a driver selector layer 224; and 3) a driver library layer 226.

The scripts 210 are written by the administrator in order to perform different server management and control functions. Each script is composed of multiple unified APIs and each unified API is responsible for a corresponding management function. In this example, the scripts 210 include register server scripts 230a, BIOS configuration scripts 230b, RAID configuration scripts 230c, hardware introspection scripts 230d, firmware upgrade scripts 230e, commodity check scripts 230f, and OS provisioning scripts 230g. Other scripts may be written for other server management functions. For example, the RAID configuration scripts 230c comprise a creation script for RAID0 volume, a creation script for RAID1 volume, a deletion script for RAID volume, etc. The BIOS configuration scripts 230b comprise an enablement script for secure boot, an enablement script for CPU virtualization, etc. The firmware upgrade scripts comprise a script for BMC firmware upgrade, a script for BIOS firmware upgrade, etc.

Thus, the register server scripts 230a handle registration of the server with the administration server 110. The BIOS configuration scripts 230b allow configuration of the BIOS of a bare metal server. The RAID configuration scripts 230c allow configuration of storage devices such as a RAID. The hardware introspection scripts 230d determine the hardware components on a bare metal server. The firmware upgrade scripts 230e allow for the upgrade of firmware for a bare metal server. The commodity check scripts 230f scan the commodities on a motherboard of a bare metal server. The number of commodities in a bare metal server (obtained from hardware introspection) should be consistent with the number of commodities in the bill of material (BOM). The OS provisioning scripts 230g allow for the provision of an operating system on a bare metal server.

The unified API component layer 222 includes APIs that are utilized by each of the scripts in the scripts section 210. In the unified API layer 222, the example APIs are representational state transfer (RESTful) APIs. Thus the unified API component layer 222 includes register server APIs 240a, BIOS configuration APIs 240b, RAID configuration APIs 240c, hardware introspection APIs 240d, firmware upgrade APIs 240e, commodity check APIs 240f, and OS provisioning APIs 240g. The scripts in the scripts section 210 are executed on the administration server 110 by an administrator to call the unified APIs in the unified API layer 222 using HTTP/HTTPS requests.

The driver selector layer 224 includes a recognition engine 250 to recognize the type of a bare metal server in the system 100. The driver selector layer 224 also includes a driver loader 252 that communicates with the driver library layer 226 to select the correct driver for the specific type of bare metal server to perform a server management command. The recognition engine 250 provides the type of bare metal server to the driver loader 252 to select the correct driver.

The recognition engine 250 can automatically recognize server models by retrieving and parsing the server information such as model name, BIOS version, and BMC version.

The recognition engine 250 in this example communicates with the BMC on the bare metal server to retrieve server identification data for automatic recognition. Based on the recognized server model, the recognition engine 250 selects a suitable driver from the driver library layer 226 that is dynamically loaded by the driver loader 252.

The driver library layer 226 includes multiple drivers that may be loaded by the driver loader 252 of the driver selector layer 224 in response to the recognition engine 250. In this example, pluggable drivers in the library layer 226 are developed based on the Distributed Management Task Force (DMTF)'s Redfish specification and the specification of native Redfish APIs associated with different bare metal server models. Thus, the drivers in the library layer 226 translate the unified APIs in the unified API component layer 222 to the native Redfish APIs for target servers. Each driver in the driver library 226 includes a set of functions such as BIOS setting function and RAID configuration function to manipulate a specific server model. Other functions of the unified APIs 210 may be incorporated into drivers in the driver library 226.

In this example, the library layer 226 includes a first driver 260, a second driver 262, and a third driver 264. Each of the drivers 260, 262, and 264 is specific to manage a corresponding type of heterogeneous bare-metal server. Each function set of the drivers 260, 262, and 264 include the functions corresponding to the unified APIs 240a-240g. Each of the functions in each of the drivers 260, 262, and 264 is developed by a software engineer for the specific type of bare metal server that may be in the system 100.

The driver library layer 226 also includes a common library 266. In this example, the common library 266 includes groups of generic translation functions. Each group is developed based on a specific version of the standard Redfish specification. Such translation functions in a group are compatible with a wide range of types of bare metal servers and thus may be used in a driver instead of specially developed translation functions of a driver. A single management function corresponds to a unified API. In a driver, there are many translation functions that are classified to different function sets. Relevant translation functions are required to work together in order to translate a unified API to native Redfish APIs. For example, to translate a "RAID0 volume creation" API, the translation functions such as listing RAID, recycling unused RAID, creating RAID, etc. are involved. The common library 266 includes groups of generic translation functions. Each group of translation functions is developed based on a specific version of the standard Distributed Management Task Force (DMTF)'s Redfish specification. Each generic translation function translates unified APIs to DMTF Redfish APIs. In the common library 266, the generic translation functions such as BIOS setting functions and RAID configuration functions are utilized to translate the unified APIs to standard DMTF Redfish APIs. The translation functions are compatible with different types of bare metal servers that are developed based on the compliance of a specific version of DMTF Redfish specification and further the translation functions can be directly utilized as intermediate, auxiliary software library to assist developers to implement the interfaces of a new driver more efficiently, instead of re-inventing specific translation functions for drivers.

In the example system 100, there are three bare-metal server models or types. In this example, the servers 130, 132, 134, 136, and 138 are a first type of server model. Each of the servers of the first type include a set of native Redfish APIs including BIOS APIs, RAID APIs, and other APIs that are used for different server management functions such as BIOS configuration, RAID configuration, hardware introspection, firmware upgrades, and OS provisioning that correspond to the Unified APIs 240a-240g.

In this example, the servers 140, 142, and 144 are a second type of server model. Each of the servers of the second type include a set of native Redfish APIs that perform server management functions. The native Redfish APIs of the second type of server model differ from those of the first type of server model. In this example, the servers 150, and 152 are a third type of server model. Each of the servers of the third type include another set of native Redfish APIs that perform server management functions. The type of native Redfish APIs differs from the first and second types of native Redfish APIs of the first and second server models.

Thus, the driver functions in the first driver 260 of the driver library 226 allow management of the servers 130, 132, 134, 136, and 138 via interfacing between the native Redfish APIs of the bare metal servers 130, 132, 134, 136, and 138 and the unified APIs 240a-240g in the unified API layer 222. The driver functions in the second driver 262 of the driver library 226 allow management of the servers 140, 142, and 144 via interfacing between the native Redfish APIs of the servers 140, 142, and 144 and the unified APIs 240a-240g in the unified API layer 222. The driver functions in the third driver 264 of the driver library 226 allow management of the servers 150 and 152 via interfacing between the native Redfish APIs of the servers 150 and 152 and the unified APIs 240a-240g in the unified API layer 222. In all these cases, the operations of the unified APIs 240a-240g are converted to operations performed by native Redfish APIs via the applicable drivers. Commands to perform such operations are initiated by a script and sent to a target server through the appropriate driver. For example, in the driver 260, a BIOS function is used to set the BIOS configuration of a first type of server such as the server 130 via the Redfish native APIs. A RAID function in the driver 260 is used to configure the RAID of the server 130 via the Redfish native APIs.

Figure 3:
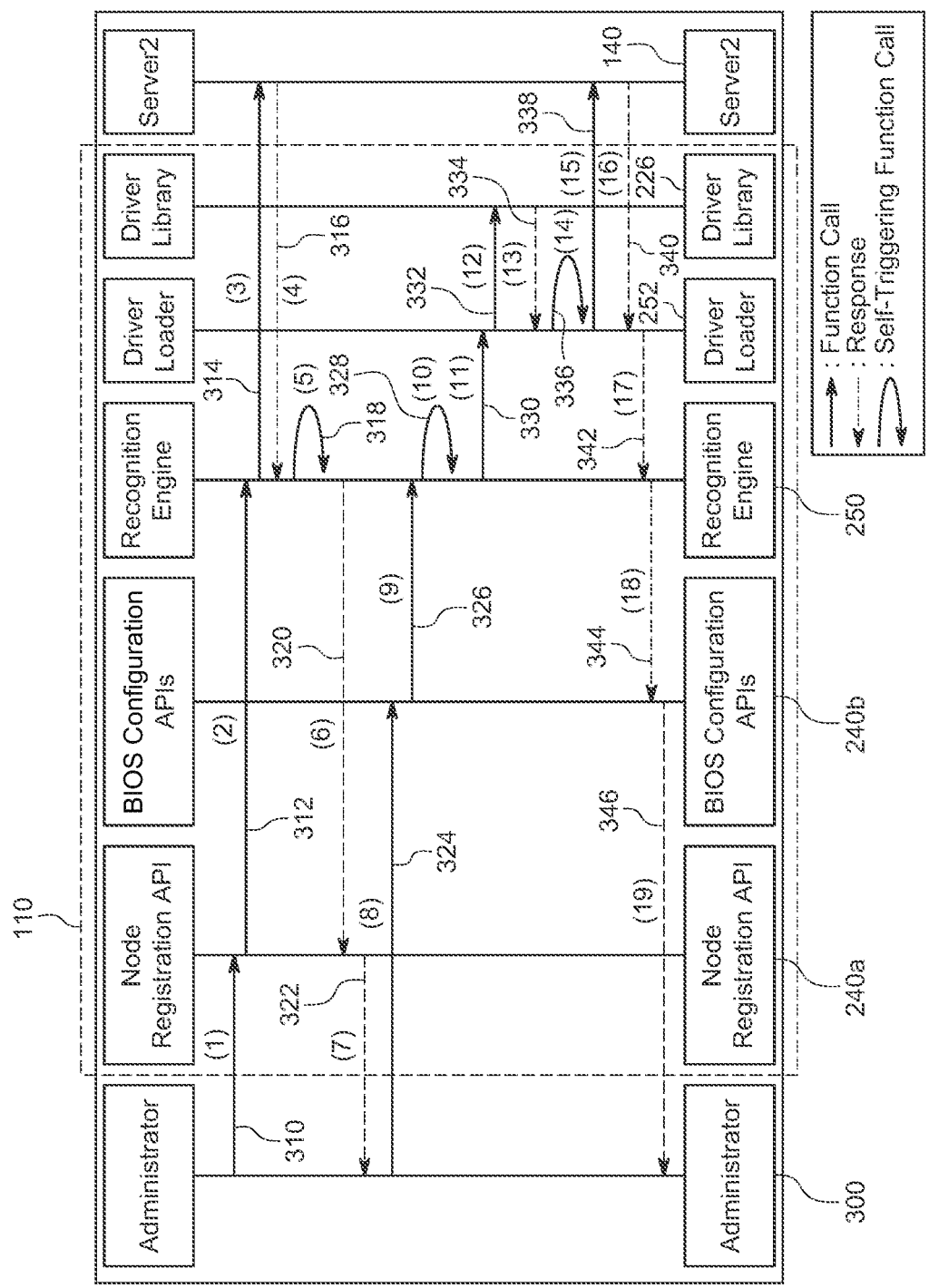
FIG. 3 is a process diagram showing the process of managing a bare metal server using the framework in FIG. 2.

FIG. 3 shows a process diagram of operating the framework 200 to manage heterogeneous servers. FIG. 3 is an example how a data center administrator 300 can adopt the example framework system 200 to perform management functions such as configuring the settings (e.g., BIOS configuration and RAID configuration) on different types of bare metal servers using the common framework 200. In the example in FIG. 3, the settings of the second type of bare-metal server in FIG. 1, such as the server 140 are configured by the framework 200. Thus, the process involves the administrator 300, unified APIs of the unified API layer 222, the recognition engine 250, the driver loader 252, the driver library 226 managed by the administration server 110, and the target server such as the server 140.

Figure 4:
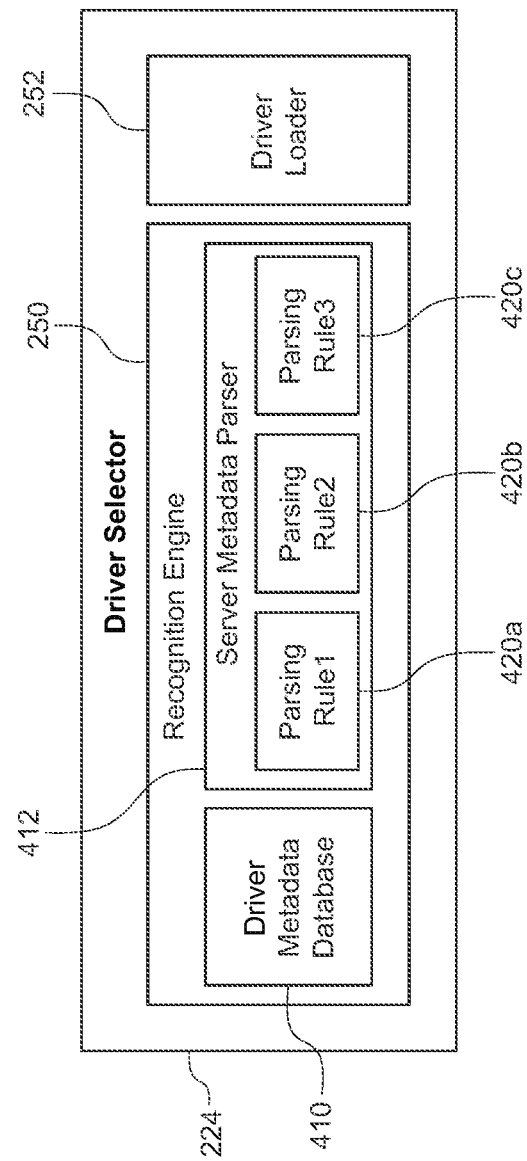
FIG. 4 is a block diagram of the driver selector of the framework in FIG. 2.

Generally, a new bare metal server is only registered with limited information, including an IP address, a username, and a password. To select an appropriate driver, the recognition engine 250 in the driver selector layer 224 plays an important role to retrieve required server information, such as the server model and firmware version. FIG. 4 shows a block diagram of the driver selector 224 in FIG. 2. The recognition engine 250 includes a driver metadata database 410 and a server metadata parser 412. The driver metadata database 410 is memory space that stores the identification information of each driver in the driver library 226. The server metadata parser 412 is used to "retrieve and parse" mandatory server information (e.g., vendor and server model) via parsing rules 420a, 420b, or 420c. In this example, the parsing rules 420a, 420b, and 420c, are predefined to corresponding different server models such as the server 130, server 140, and server 150 respectively. For example, the parsing rule 420a may define the data structure of the raw data provided by server 130. The mandatory information corresponding to defined data structures such as server vendor, server model, BMC vendor, BMC firmware version, and BIOS firmware version can be extracted from server 130. However, by adopting this parsing rule, the information from the server 140 can fail to be extracted since the data structure of raw data provided by the server 140 differs from that of raw data provided by the server 130. The parsing rules allow the correct server information, such as the vendor and version, to be obtained from the BMC of a bare metal server. After the parsed server information is mapped to identification information of a driver in the driver metadata database 410, the driver loader 252 can load the suitable driver from the driver library 226 for the type of server. The loaded driver may be used to manage and control the specific bare metal server corresponding to the obtained identification information. Thus, the process in FIG. 3 obtains the model of server, registers the server as a new node, and uses unified APIs in the unified API layer 222 to configure the bare metal server.

First, an administrator through the administration server 110 provides the information for the target server such as the server 140, including the BMC IP address, Username, and Password to the node registration API 240a for registration of the new server 140 (310). This may be done through the scripts 230a, or processes such as calling node registration APIs through executing a Java program integrated with the node registration APIs. Alternatively, administrators can adopt the command line tools (e.g., curl) to directly issue the HTTP requests to call the node registration APIs via the administration server 110. The information for the target server is assigned by the administrator 300 for a new bare metal server. The node registration API 240a sends the obtained information (IP Address, Username, password) relating to the target server 140 to the recognition engine 250 (312). The recognition engine 250 accesses the BMC in the server 140 via the network 122 by using the obtained information. The recognition engine 250 requests system information from the BMC (314). The BMC responds to the request by retrieving system information such as the BMC version, the BIOS version, and the server model name, and sends the system information of the server 140 to the recognition engine 250 (316).

The recognition engine 250 parses the returned system information and then saves the information as the identification of the server 140 (318). The recognition engine 250 sends the identification information of the server 140 to the node registration API 240a (320). The node registration API 240a sends the identification information of the server 140 to the administrator 300 (322).

The administrator 300 adopts the BIOS configuration API 240b for modifying BIOS values (324). The administrator 300 may use a script to adopt the BIOS configuration API 240b. In this example, by executing scripts on the administration server 110, HTTP requests are issued to call BIOS configuration APIs for updating specified BIOS attributes. After BIOS configuration APIs receive the user's requests, they pass the requests to recognition engine 250 (326). The requests include the server information for selection of the correct driver. The recognition engine 250 selects the appropriate driver from the driver library 226 based on the identification of the server 140 obtained previously (328). In this example, the recognition engine 250 selects the driver 262 that matches the identification of the server 140.

The recognition engine 250 notifies the driver loader 252 to load the appropriate driver (330). The driver loader 252 then requests the appropriate driver from the driver library 226 (332). In this example, the recognition engine 250 notifies the driver loader 252 to load the driver 262 based on the identification of the type of the server 140. The driver library 226 provides the requested driver 262 (334). After the driver 262 is loaded, the BIOS configuration API 240b is converted to the native Redfish APIs on the server 140 with the BIOS functions in the driver 262 (336). The converted Redfish APIs are sent to the server 140 for configuring BIOS settings on the server 140 (338). Once the configuration is complete, the BMC of the server 140 sends a response acknowledgment to the driver loader 252 (340). On receiving the notification, the driver loader 252 sends an acknowledgment to the recognition engine 250 (342). The recognition engine 250 passes the response to the BIOS configuration API 240b (344). The BIOS configuration API 240b passes the acknowledgement to the administrator 300 to complete the process (346)

Figure 5:
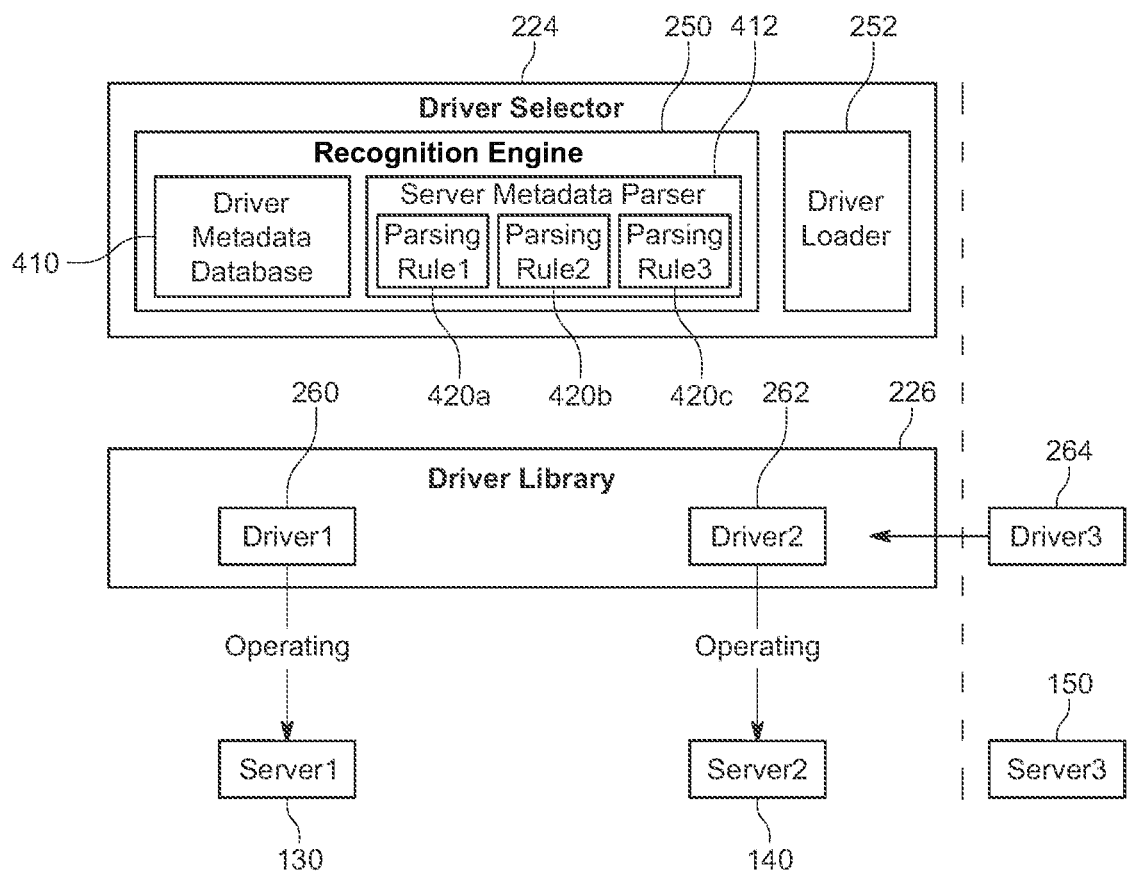
FIG. 5 is a diagram showing the addition of new drivers to the driver library in FIG. 2.

There are circumstances where a new type of bare metal server is introduced with no suitable driver in the driver library 226. In this case, the driver package must be obtained from the vendor such as downloading the package from a vendor website. The driver package relating to a new server can be copied to a folder in the driver library 226 and the identification information for the new driver may be added to the driver metadata database of the recognition engine 250. FIG. 5 shows an example of the addition of a new server such as the server 150. When the server 150 is a new type of server, a driver package such as the driver 264 may be copied to a new folder in the driver library 226. The driver metadata database 410 of the recognition engine 250 is then updated to include the identification information of the new driver. The new metadata is a text file, which can be downloaded along with the new driver. An administrator can copy this new metadata in the form of text file into a folder of the driver library 226 so that an auto-scanning process can periodically scan the folder, read the new metadata text file, and then insert the metadata information into the driver metadata database 410. As a result, the new driver 264 may be accessed through the driver library 226 to manage and control the new type of server such as the server 150. Meanwhile, all the other operations managing the existing servers such as servers of the type of the server 130 and the type of server 140 through driver sets 260 and 262 are not interrupted.

Figure 6:
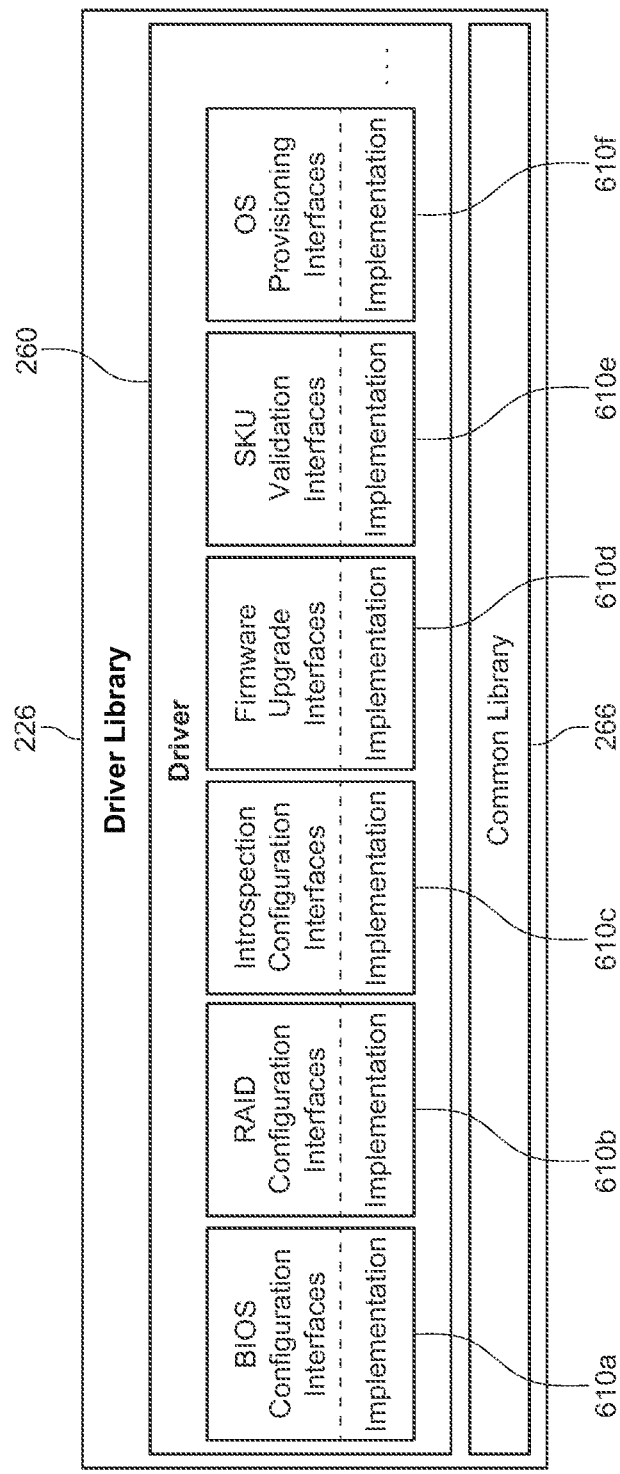
FIG. 6 is a block diagram of an example driver of the driver library of the framework in FIG. 2.

As the number of new server models increases in the system, a large number of drivers will need to be implemented accordingly in the driver library 226. To effectively develop drivers with high quality, the architecture of driver library 226 may use the common library 266. FIG. 6 shows a block diagram of the driver library 226. As explained above, the driver library 226 contains certain drivers that are specific to a type of bare metal server. For example, the driver 260 includes driver function sets 610a, 610b, 610c, 610d, 612e, and 612f that correspond to the unified APIs 240b, 240c, 240d, 240e, 240f, and 240g in FIG. 2 for implementation of interfacing with the native Redfish APIs on the type of server such as the server 130. Thus, the driver function set 610a includes BIOS configuration interfaces, the driver function set 610b includes RAID configuration interfaces, the driver function set 610c includes introspection configuration interfaces, the driver function set 610d includes firmware upgrade interfaces, the driver function set 610e includes SKU validation interfaces, and the driver function set 610f includes OS provisioning interfaces. These implemented interfaces can convert the functions of the unified APIs into the native Redfish APIs for performance of the functions on the server 130. Thus, specific driver such as the driver 260 includes predefined interfaces for management functions such as BIOS configuration, RAID configuration, introspection, SKU validation, firmware upgrade, and OS provisioning. The driver library 226 also includes the common library 266 with groups of general translation functions for drivers developed based on the standard Redfish specification.

By adopting the common library 266, developers can save tremendous amount of time to implement the interfaces in a new driver, which is particularly effective when the native Redfish APIs of a new type of bare metal server fully conform to the standard Redfish specification. Otherwise, the architecture still allows customizing a new driver in other Redfish standards to implement the interfaces when the common library 266 fails to support a new server model. Additionally, the new driver can be also extended with new interfaces for the operation of a new server.

Figure 7:
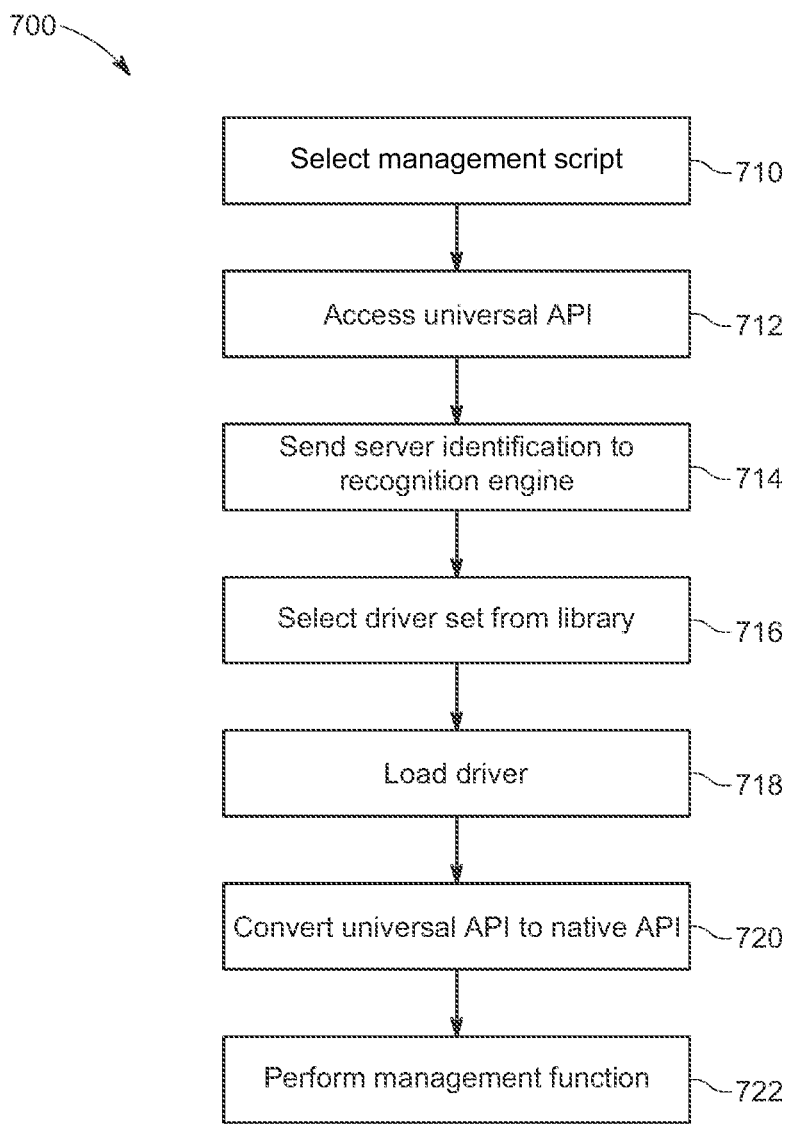
FIG. 7 is a flow diagram of a routine to manage heterogeneous bare-metal servers using a generic framework.
Figure 8:
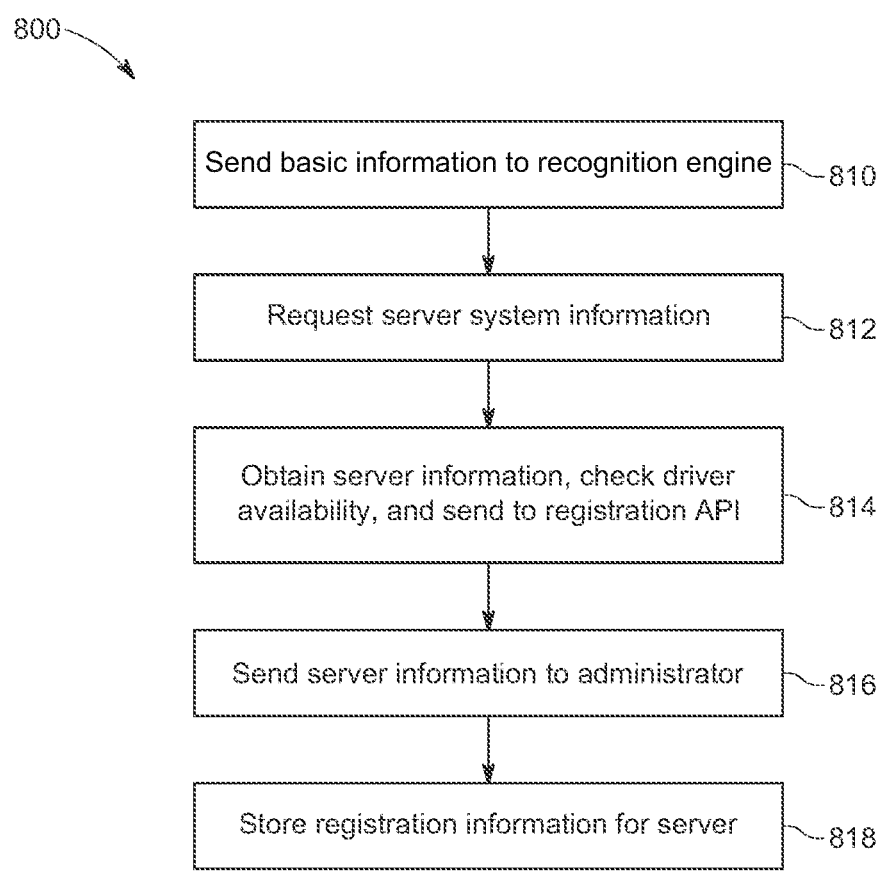
FIG. 8 is a flow diagram of a routine to register a new bare metal server to the example framework.

FIG. 7 shows a flow diagram of a management function routine 700 executed by the example framework 200 in FIG. 2. FIG. 8 shows a flow diagram of a routine to register a new bare metal server to allow obtaining system information for the selection of an appropriate driver. The flow diagrams in FIG. 7-8 are representative of example machine readable instructions for the process of managing bare metal servers and registering a new bare metal server. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 7-8, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As shown in FIG. 7, a routine 700 first receives a selection of a management script based on the desired server management function (710). The appropriate universal API is accessed based on the selected script (712). The server identification data for the bare metal server is sent to the recognition engine 250 (714). The recognition engine 250 determines the appropriate driver and selects the determined driver from the driver library 226 (716). The loader then loads the driver from the driver library 226 (718). The loaded driver converts the universal API to the native API on the server (720). The native API then performs the desired management function (722).

FIG. 8 is a flow diagram of the registration routine 800 for adding a new bare metal server to the system 100. The new bare metal server first is connected to the network and the administration server 110 receives basic information such as the BMC IP address, username and password, and passes the basic information to the recognition engine 250 (810). The recognition engine 250 obtains the basic information and requests system information from the BMC of the new server (812). The recognition engine 250 then obtains server information such as the model name and BMC version and checks whether a matching driver is available in the driver library 226. The recognition engine 250 sends the server information back to the registration API (814). The registration API sends the server information back to the administrator (816) and stores the registration information (818).

The server information now stored by the administration server 110 may be used by the unified APIs in the unified API layer 222 to match corresponding drivers from the driver library 226. During the registration process, where no drivers correspond to the registered server, the administrator may be alerted that a driver must be provided to the driver library 226. Alternatively, the registration process may fail due to the lack of a matching driver at step 814.

Figure 9:
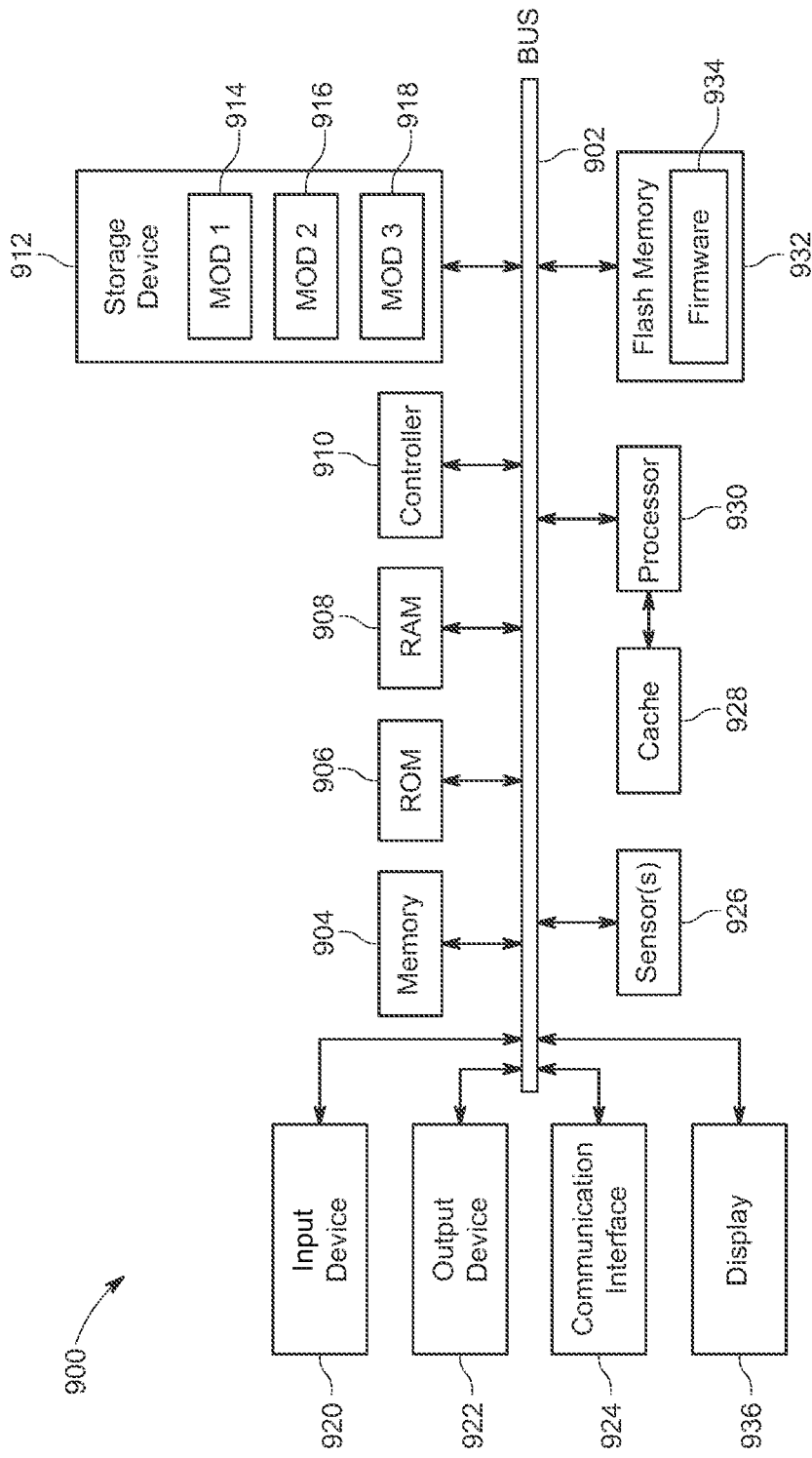
FIGS. 9-10 are block diagrams of computer systems to implement the processes described herein.

FIG. 9 illustrates an example computing system 900, in which the components of the computing system are in electrical communication with each other using a bus 902. The system 900 includes a processing unit (CPU or processor) 930; and a system bus 902 that couples various system components, including the system memory 904 (e.g., read only memory (ROM) 906 and random access memory (RAM) 908), to the processor 930. The system 900 can include a cache of high-speed memory connected directly with, in close proximity to, or integrated as part of the processor 930. The system 900 can copy data from the memory 904 and/or the storage device 912 to the cache 928 for quick access by the processor 930. In this way, the cache can provide a performance boost for processor 930 while waiting for data. These and other modules can control or be configured to control the processor 930 to perform various actions. Other system memory 904 may be available for use as well. The memory 904 can include multiple different types of memory with different performance characteristics. The processor 930 can include any general purpose processor and a hardware module or software module, such as module 1 914, module 2 916, and module 3 918 embedded in storage device 912. The hardware module or software module is configured to control the processor 930, as well as a special-purpose processor where software instructions are incorporated into the actual processor design. The processor 930 may essentially be a completely self-contained computing system that contains multiple cores or processors, a bus, memory controller, cache, etc. A multi-core processor may be symmetric or asymmetric.

To enable user interaction with the computing system 900, an input device 920 is provided as an input mechanism. The input device 920 can comprise a microphone for speech, a touch-sensitive screen for gesture or graphical input, keyboard, mouse, motion input, and so forth. In some instances, multimodal systems can enable a user to provide multiple types of input to communicate with the system 900. In this example, an output device 922 is also provided. The communications interface 924 can govern and manage the user input and system output.

Storage device 912 can be a non-volatile memory to store data that is accessible by a computer. The storage device 912 can be magnetic cassettes, flash memory cards, solid state memory devices, digital versatile disks, cartridges, random access memories (RAMs) 908, read only memory (ROM) 906, and hybrids thereof.

The controller 910 can be a specialized microcontroller or processor on the system 900, such as a BMC (baseboard management controller). In some cases, the controller 910 can be part of an Intelligent Platform Management Interface (IPMI). Moreover, in some cases, the controller 910 can be embedded on a motherboard or main circuit board of the system 900. The controller 910 can manage the interface between system management software and platform hardware. The controller 910 can also communicate with various system devices and components (internal and/or external), such as controllers or peripheral components, as further described below.

The controller 910 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 910 to initiate or conduct specific hardware recovery procedures or operations, as further described below.

The controller 910 can also include a system event log controller and/or storage for managing and maintaining events, alerts, and notifications received by the controller 910. For example, the controller 910 or a system event log controller can receive alerts or notifications from one or more devices and components, and maintain the alerts or notifications in a system event log storage component.

Flash memory 932 can be an electronic non-volatile computer storage medium or chip that can be used by the system 900 for storage and/or data transfer. The flash memory 932 can be electrically erased and/or reprogrammed. Flash memory 932 can include EPROM (erasable programmable read-only memory), EEPROM (electrically erasable programmable read-only memory), ROM, NVRAM, or CMOS (complementary metal-oxide semiconductor), for example. The flash memory 932 can store the firmware 934 executed by the system 900 when the system 900 is first powered on, along with a set of configurations specified for the firmware 934. The flash memory 932 can also store configurations used by the firmware 934.

The firmware 934 can include a Basic Input/Output System or equivalents, such as an EFI (Extensible Firmware Interface) or UEFI (Unified Extensible Firmware Interface). The firmware 934 can be loaded and executed as a sequence program each time the system 900 is started. The firmware 934 can recognize, initialize, and test hardware present in the system 900 based on the set of configurations. The firmware 934 can perform a self-test, such as a POST (Power-On-Self-Test), on the system 900. This self-test can test the functionality of various hardware components such as hard disk drives, optical reading devices, cooling devices, memory modules, expansion cards, and the like. The firmware 934 can address and allocate an area in the memory 904, ROM 906, RAM 908, and/or storage device 912, to store an operating system (OS). The firmware 934 can load a boot loader and/or OS, and give control of the system 900 to the OS.

The firmware 934 of the system 900 can include a firmware configuration that defines how the firmware 934 controls various hardware components in the system 900. The firmware configuration can determine the order in which the various hardware components in the system 900 are started. The firmware 934 can provide an interface, such as an UEFI, that allows a variety of different parameters to be set, which can be different from parameters in a firmware default configuration. For example, a user (e.g., an administrator) can use the firmware 934 to specify clock and bus speeds; define what peripherals are attached to the system 900; set monitoring of health (e.g., fan speeds and CPU temperature limits); and/or provide a variety of other parameters that affect overall performance and power usage of the system 900. While firmware 934 is illustrated as being stored in the flash memory 932, one of ordinary skill in the art will readily recognize that the firmware 934 can be stored in other memory components, such as memory 904 or ROM 906.

System 900 can include one or more sensors 926. The one or more sensors 926 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 926 can communicate with the processor, cache 928, flash memory 932, communications interface 924, memory 904, ROM 906, RAM 908, controller 910, and storage device 912, via the bus 902, for example. The one or more sensors 926 can also communicate with other components in the system via one or more different means, such as inter-integrated circuit (I2C), general purpose output (GPO), and the like. Different types of sensors (e.g., sensors 926) on the system 900 can also report to the controller 910 on parameters, such as cooling fan speeds, power status, operating system (OS) status, hardware status, and so forth. A display 936 may be used by the system 900 to provide graphics related to the applications that are executed by the controller 910.

Figure 10:
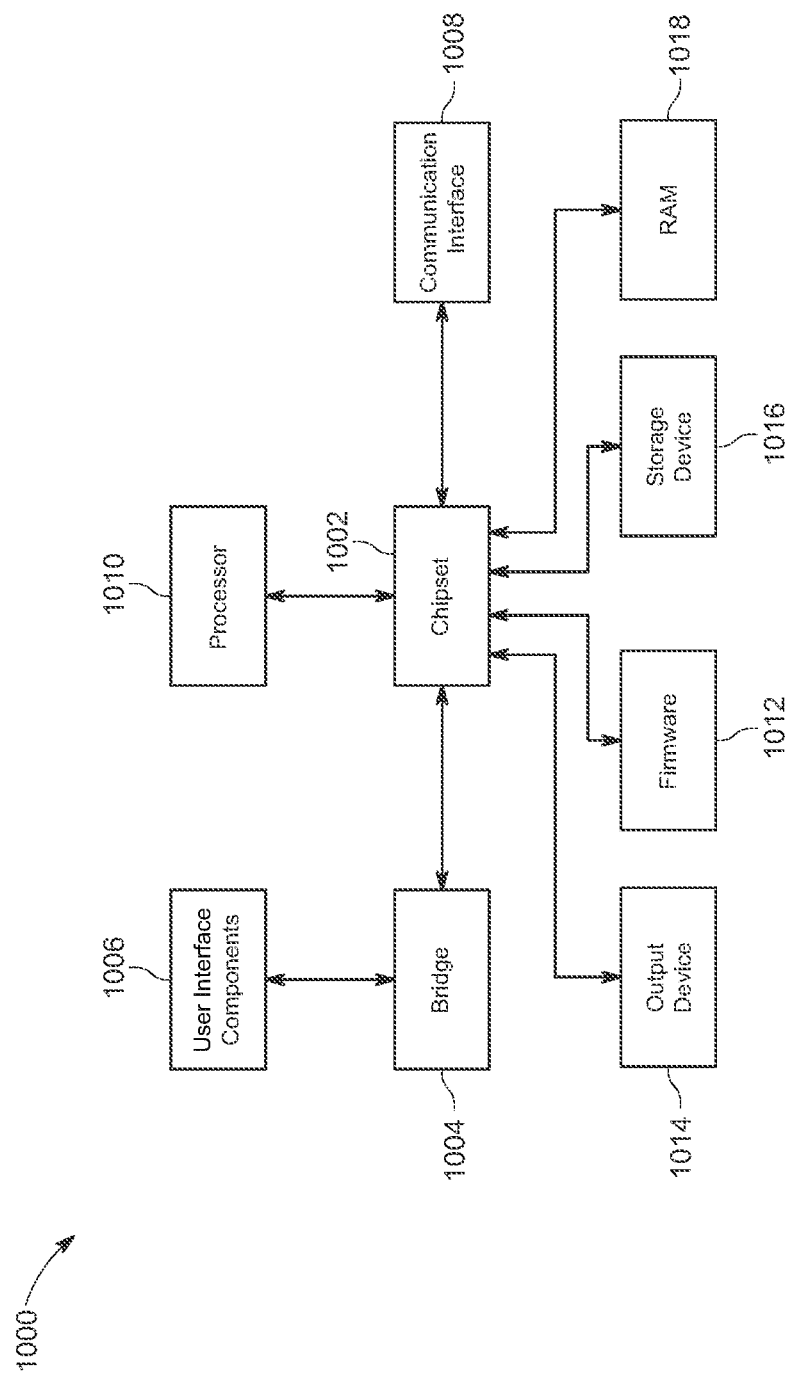

FIG. 10 illustrates an example computer system 1000 having a chipset architecture that can be used in executing the described method(s) or operations, and generating and displaying a graphical user interface (GUI). Computer system 1000 can include computer hardware, software, and firmware that can be used to implement the disclosed technology. System 1000 can include a processor 1010, representative of a variety of physically and/or logically distinct resources capable of executing software, firmware, and hardware configured to perform identified computations. Processor 1010 can communicate with a chipset 1002 that can control input to and output from processor 1010. In this example, chipset 1002 outputs information to output device 1014, such as a display, and can read and write information to storage device 1016. The storage device 1016 can include magnetic media, and solid state media, for example. Chipset 1002 can also read data from and write data to RAM 1018. A bridge 1004 for interfacing with a variety of user interface components 1006, can be provided for interfacing with chipset 1002. User interface components 1006 can include a keyboard, a microphone, touch detection and processing circuitry, and a pointing device, such as a mouse.

Chipset 1002 can also interface with one or more communication interfaces 1008 that can have different physical interfaces. Such communication interfaces can include interfaces for wired and wireless local area networks, for broadband wireless networks, and for personal area networks. Further, the machine can receive inputs from a user via user interface components 1006, and execute appropriate functions, such as browsing functions by interpreting these inputs using processor 1010.

Moreover, chipset 1002 can also communicate with firmware 1012, which can be executed by the computer system 1000 when powering on. The firmware 1012 can recognize, initialize, and test hardware present in the computer system 1000 based on a set of firmware configurations. The firmware 1012 can perform a self-test, such as a POST, on the system 1000. The self-test can test the functionality of the various hardware components 1002-1018. The firmware 1012 can address and allocate an area in the memory 1018 to store an OS. The firmware 1012 can load a boot loader and/or OS, and give control of the system 1000 to the OS. In some cases, the firmware 1012 can communicate with the hardware components 1002-1010 and 1014-1018. Here, the firmware 1012 can communicate with the hardware components 1002-1010 and 1014-1018 through the chipset 1002, and/or through one or more other components. In some cases, the firmware 1012 can communicate directly with the hardware components 1002-1010 and 1014-1018.

It can be appreciated that example systems 900 (in FIG. 9) and 1000 can have more than one processor (e.g., 930, 1010), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A server management system comprising:
   a target bare metal server;
   a network coupled to the target bare metal server; and
   an administrative server coupled to the network, the administrative server executing a framework for managing the target bare metal server, the framework including:
      a unified API for performance of the management function;
      a recognition engine extracting identification information from the server and selecting a driver from a plurality of drivers based on the identification information, each of the plurality of drivers associated with a different type of bare metal server; and
      a driver loader loading the selected driver to translate the unified API to a native API on the target bare metal server to perform the management function on the target bare metal server.

2. The server management system of claim 1, wherein the administrative server executes a user script for initiating the management function of the target bare metal server.

3. The system of claim 1, wherein the management function is one of registering the target bare metal server; configuring a basic input/output system (BIOS); configuring a storage device; introspection of hardware; upgrading firmware; checking commodities; or provisioning an operating system.

4. The system of claim 1, further comprising a driver library storing the plurality of drivers.

5. The system of claim 4, wherein the driver library includes a common library including groups of translation functions that translate the unified API into standard Redfish APIs.

6. The system of claim 1, wherein the target bare metal server includes a baseboard management controller (BMC), wherein the BMC communicates with the administrative server via the network.

7. The system of claim 1, wherein the native API is a Redfish API.

8. The system of claim 1, wherein the unified API is one of a plurality of unified APIs each associated with a server management function.

9. The system of claim 1, wherein the unified API is a server registration API that obtains the server information from the target bare metal server when the target bare metal server is initially connected to network.

10. A method of managing a plurality of heterogeneous servers through a framework having a recognition engine and a driver library executed by an administrative server, the method comprising:
   initiating performance of a management function of one of the plurality of heterogeneous servers;
   accessing a unified API corresponding to the management function;
   extracting identification information from the one of the plurality of servers;

loading a driver from the driver library corresponding to the identification information of the one of the plurality of servers;

executing the driver to translate the unified API to a native API on the server to perform the management function.

11. The method of claim 10, wherein the performance of the management function is initiated by a script executed by the administrative server.

12. The method of claim 10, wherein the management function is one of registering the server; configuring a basic input/output system (BIOS); configuring a storage device; introspection of hardware; upgrading firmware; checking commodities; or provisioning an operating system.

13. The method of claim 12, further comprising storing the plurality of drivers in a driver library.

14. The method of claim 10, wherein the driver library includes a common library including groups of translation functions that translate the unified API into standard Redfish APIs.

15. The method of claim 10, wherein the server includes a baseboard management controller (BMC).

16. The method of claim 10, wherein the native API is a Redfish API.

17. The method of claim 10, wherein the unified API is one of a plurality of unified APIs each associated with a server management function.

18. The method of claim 10, wherein the unified API is a server registration API that obtains the server information from the server when the server is initially connected to network.

19. An administrative server allowing management of networked computer devices, the server comprising:

a set of unified APIs each corresponding to a management function;

a recognition engine obtaining identification information of a selected networked computer device;

a driver library including a plurality of drivers, each of the drivers translating one of the unified APIs into a native API of one type of networked computer device, wherein the recognition engine selects a driver from the driver library based on the selected type of networked computer device; and a driver loader coupled to the recognition engine, the driver loader loading the selected driver to perform a management function on the selected computer device.

20. The administrative server of claim 19, wherein the networked computer devices are each a server having a baseboard management controller (BMC) communicating with the administrative server.

* * * * *